April 24, 1934.  C. L. MOORMAN ET AL  1,956,245
TRUCK
Filed May 8, 1930  2 Sheets-Sheet 1

Inventors
Charles L. Moorman
Theodore H. Davis
by Frank Schraeder Jr
Attorney.

April 24, 1934.  C. L. MOORMAN ET AL  1,956,245
TRUCK
Filed May 8, 1930   2 Sheets-Sheet 2
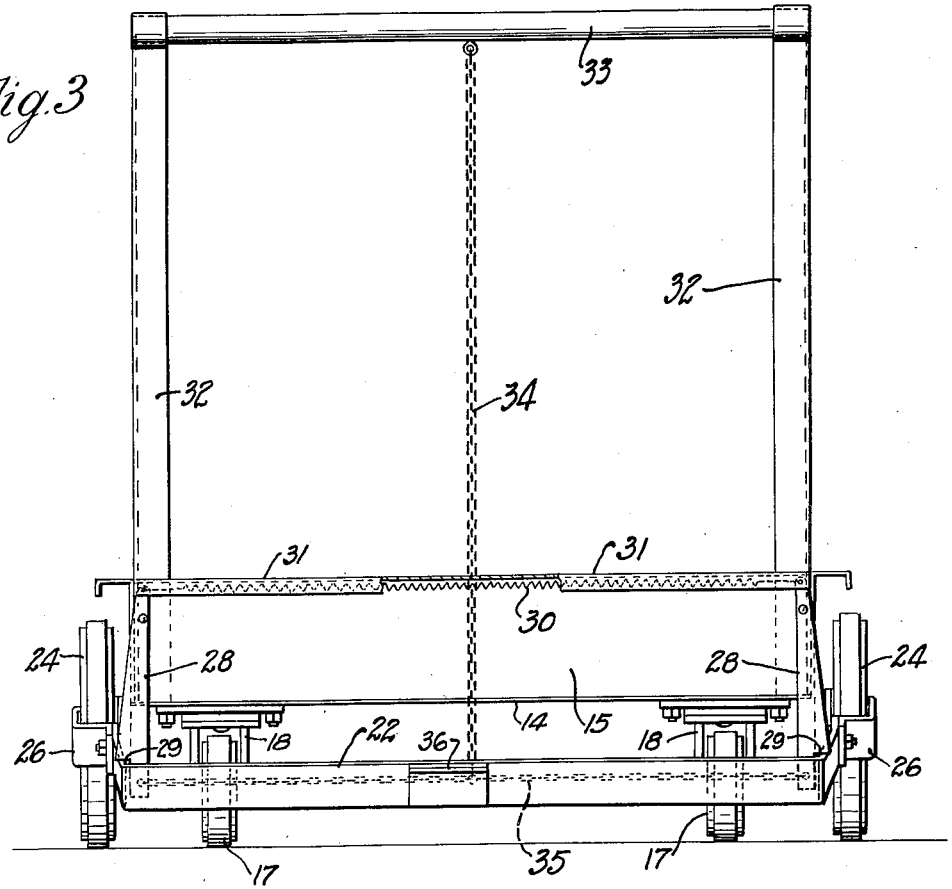
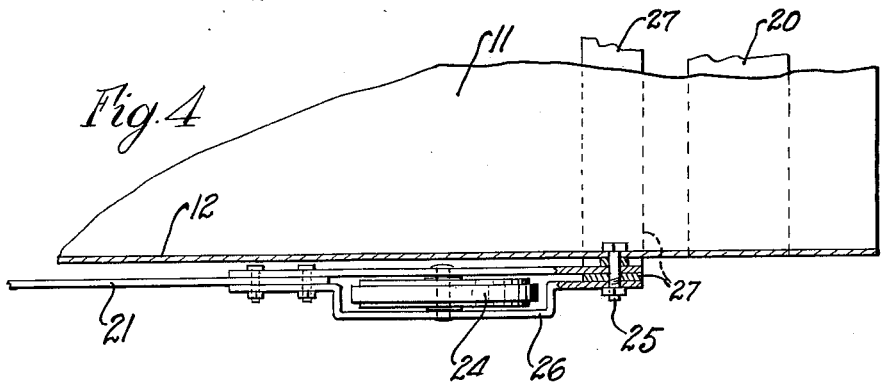
Inventors
Charles L. Moorman
Theodore H. Davis
by Frank Schraeder Jr
Attorney.

Patented Apr. 24, 1934

1,956,245

UNITED STATES PATENT OFFICE 1,956,245

TRUCK

Charles L. Moorman and Theodore H. Davis, Chicago, Ill., assignors to Wepsco Steel Products Co., Chicago, Ill., a corporation of Illinois Application May 8, 1930, Serial No. 450,677

4 Claims. (Cl. 280—44)

The invention relates to trucks and more particularly to that type known as pan trucks.

It is an object of the invention to provide a tiltable pan truck so that for the purpose of loading or unloading the pan is in inclined position, with the forward end in lowermost position.

A further object aims at providing a pan truck which upon release of a locking member automatically assumes a tilted position for loading.

A still further object constitutes the provision of a pan which at the rear end is wheeled and at the forward end is releasably maintained in horizontal position and upon release drops into tilted position.

It is a still further object to provide certain features of construction and arrangement tending to enhance the usefulness and efficiency of device of this kind.

With these and other equally important objects in view which will become apparent from a perusal of the invention, the latter comprises the means described in the specification, particularly pointed out in the claims forming a part thereof, and illustrated in the accompanying drawings, in which Fig. 1 is a perspective view of the truck embodying my invention.

Fig. 3 is an enlarged rear view of the truck, and

Fig. 4 is an enlarged section on the line 4—4 of Fig. 2.

Figure 1:
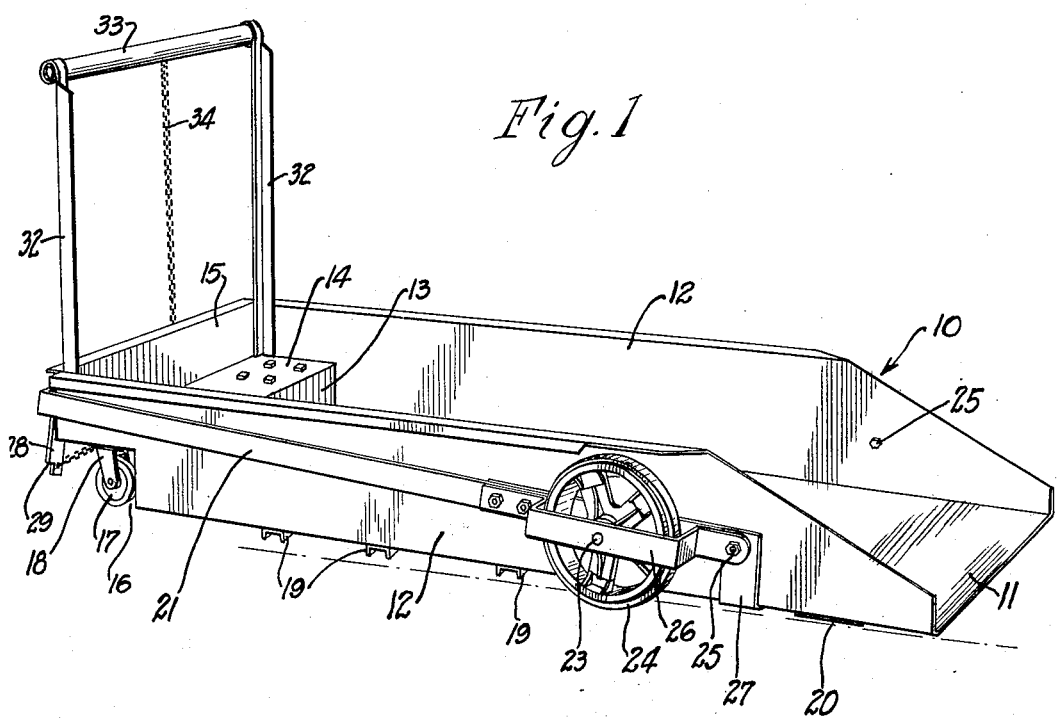

Referring to the several views in the drawings the truck comprises a body portion in the shape of a pan generally designated by 10 and comprising a bottom 11, side walls 12, which taper downwardly at the forward end. The bottom wall stops short of the rear end of the side walls and is provided with a vertical portion 13, which about the middle of the height of the side walls continues into a horizontal portion 14, and thence rises flush with the end of said side walls to form the rear wall 15. This step formation of the rear wall affords a recess 16, to encase castor wheels 17, mounted in bracket 18, secured to the bottom wall.

The bottom 11 is reinforced by spaced cross channels 19, and by a stiffening plate 20. The pan 10 is embraced by a U-frame 21 with the cross member 22 being juxtaposed to the rear end of the pan. The free ends of the frame are pivotally secured to the axle 23 of ground wheels 24, and are continued to pivotal engagement with the side walls 12 of the pan as at 25. A bar 26 is secured to the free ends of the frame and is bent out to provide clearance for the ground wheel. The pivotal connection 25 is effected through a bail member 27 whose cross piece contacts with the bottom.

Figure 2:
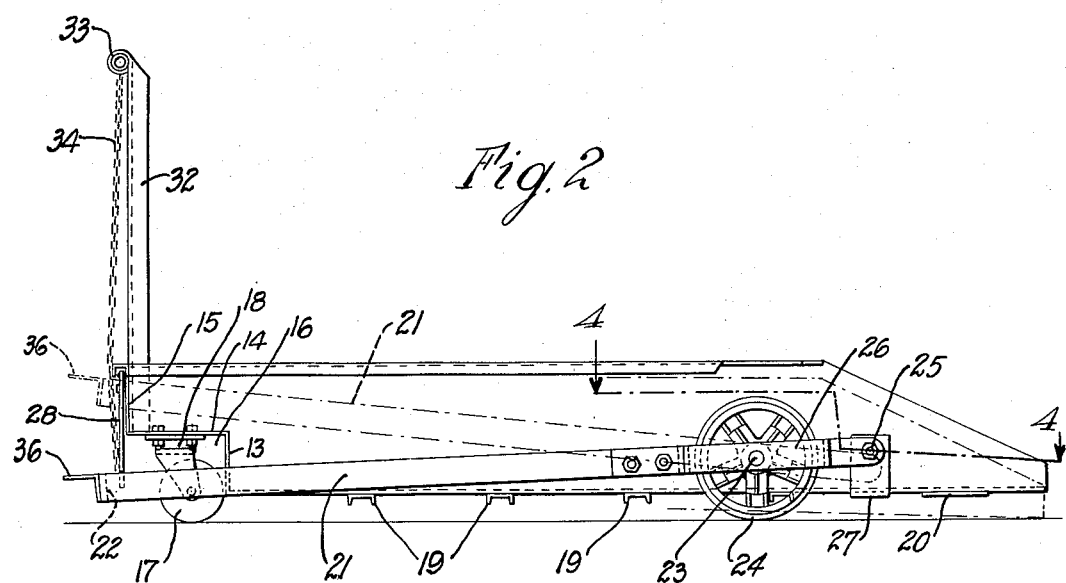
Fig. 2 is a side view of the improved truck.

From the foregoing it is obvious that the pan is supported at the rear by the wheels 17, and at the front by the frame 21, which is pivotally supported by the axles 23 of the ground wheels. Accordingly the pan 10 is held in horizontal position if the cross member 22 of the frame is in lowermost position, as shown in Fig. 2, but if the rear end of the frame 21 is permitted to rise under the weight of the forward end of the pan acting on the frame between the pivots 23 and 25, then the pan will drop at its forward end, as shown in Fig. 1, where the truck is in load receiving position.

In order to lock the frame in lowermost position to maintain the pan horizontally latches 28 are pivotally secured to the rear wall 15 and are equipped with a recess 29 to receive the upper edge of the frame when the latter is in lowermost position. The free ends of the latches are connected by a spring 30 to maintain the latches in frame engaging position. The spring is encased by a U-flange 31 provided at the upper end of the rear wall 15.

In the corners of the rear wall and side walls rise uprights 32 connected at the upper end by a handle bar 33. A flexible member 34, such as a chain is secured to the center of the handle bar and is secured at the lower end to the center of a horizontal chain 35, connecting the lower ends of latches 28 so that upon an upward pull of the chain 34 the latches are moved against the tension of spring 30 to release the frame.

In operation the truck is arranged in the proper place and the chain 34 is pulled upwards to release the rear end of the U-frame by forcing the latches away from the frame. The forward end of the pan will then drop as its weight forces down the free pivotal ends of the frame about the pivots 23, while the rear end is raised. After loading the truck, the operator steps on a foot piece 36 in the form of an angle iron secured to the cross member of the frame, whereupon the latches lock the frame to maintain the forward end of the pan in elevated position. When discharging, the pan is again tilted by releasing the latches.

While the drawings disclose a preferred embodiment of the invention, numerous changes may be made without departing from the spirit of the invention. We, therefore, do not limit ourselves to the details of construction as shown, but claim our invention as broadly as the state of the art permits.

We claim:

1. A truck comprising an open-end pan having wheels at its rear end, a U-shaped frame embracing said pan, said frame being pivotally connected near the front end of and to said pan, a pair of wheels connected to said frame and near its pivotal support and constituting fulcrums for said frame, the free end of said frame being movable into raised or lowered positions whereby the front or open end of said pan is respectively lowered or raised, and means mounted on said pan for cooperating with said frame for releasably retaining the front end of said pan in raised position.

2. A truck as embodied in claim 1 wherein said means comprises a latch mounted on the rear end of said pan for retaining the free end of said frame in lowered position to thereby retain the front or open end of said pan in raised position.

3. A truck as embodied in claim 1 and including a pair of spindles carried by said frame intermediate its pivotal and free ends, said frame wheels being mounted on said spindles.

4. A truck comprising a tiltable pan having a closed end and an open end and having wheels attached thereto at said closed end thereof, a frame having its ends pivotally connected near the open end of said pan, a pair of wheels detached from said pan but supported on said frame near the pivotal ends thereof, and means mounted on said pan for normally preventing the tilting of said pan, said means being arranged for retaining the free end of said frame in lowered position to thereby retain said pan in lateral position, all of said wheels always maintaining contact with the floor or support for the truck during all positions of said pan.

CHARLES L. MOORMAN.
THEODORE H. DAVIS.